United States Patent [19]

Loffler et al.

[11] 4,150,595

[45] Apr. 24, 1979

[54] SUBWATER GRANULATING DEVICE

[75] Inventors: Reinhard Löffler, Ludwigsburg-Ossweil; Harald Possler, Ditzingen-Heimerdingen, both of Fed. Rep. of Germany

[73] Assignee: Werner & Pfleiderer, Stuttgart, Fed. Rep. of Germany

[21] Appl. No.: 835,138

[22] Filed: Sep. 21, 1977

[30] Foreign Application Priority Data

Oct. 14, 1976 [DE] Fed. Rep. of Germany ....... 2646309

[51] Int. Cl.² ............................................. B29F 3/08
[52] U.S. Cl. ........................................ 83/171; 425/71; 425/232; 425/313; 425/382 R; 425/404; 425/464
[58] Field of Search .......................... 83/98, 170, 171; 264/142, 148; 425/382 R, 404, 313, 315, 316, 67, 70, 71, DIG. 230, 311, 464, 232, 377

[56] References Cited

U.S. PATENT DOCUMENTS

| | | | |
|---|---|---|---|
| 3,196,487 | 7/1965 | Snelling | 83/170 X |
| 3,341,892 | 9/1967 | Mayner | 425/313 X |
| 3,349,433 | 10/1967 | Schippers et al. | 425/313 X |
| 3,792,950 | 2/1974 | Cuff | 425/313 |

*Primary Examiner*—Roy Lake
*Assistant Examiner*—Mark Rosenbaum
*Attorney, Agent, or Firm*—Hane, Roberts, Spiecens & Cohen

[57] ABSTRACT

A sub-water granulating device for granulating thermoplastic synthetic plastics materials is operatively combined with the nozzle plate of a screw extruder. The device comprises a rotary cutting tool head which is enclosed by a dome or hood. Flushing water is fed into the dome and discharged therefrom and the flow of water is directed to clean the cutting tools and to carry out granules cut by the tools thereby preventing the formation of lumps of granules and adhesion thereof to the nozzle plate.

4 Claims, 3 Drawing Figures

SUBWATER GRANULATING DEVICE

The present invention relates to a granulating device for granulating below water thermoplastic synthetic plastics materials, and more particularly to a granulating device of this type operatively connected with the nozzle plate of an extruder and comprising a rotary cutting head or tool head concentrically disposed in a dome or cap which is in communication with connectors for feeding-in and discharging a flow of water.

BACKGROUND

There is known for instance from German Pat. No. 1,037,116 a below-water granulating device with water feeding means within the range of the nozzle plate of an extruder. According to this device a flow of cooling water either through separate nozzle bores or through a hollow drive shaft for the cutting tool head of the device is used to flush granules cut adjacent to the nozzle plate toward and into an outlet. However, it has been found that the inherent propelling action of the cutting tools impedes complete removal of the granulate pellets out of the range of the cutting tool head as is required.

An under-water granulation is particularly suitable for thermoplastic degraded synthetic plastics materials which pass through the nozzle plate of an extruder at temperatures within the range of 190° to 260° C.

At higher temperatures as they particularly occur at processing of degraded thermoplastic synthetic plastics materials, for instance degraded polypropylene in an extruder the melt particles which are cut when in hot condition rigidify much slower than normal. As a result, part of the hot cut granulate tends to form lumps or adheres within the range of the middle of the nozzle plate and on the cutting tool head.

These disadvantages are particularly pronounced with thermoplastics which are processed at relatively low viscosities, for instance polyamides and polyesters.

According to a granulating device disclosed in German published application Ser. No. 2,455,757 the synthetic plastics to be processed when the melted strands emerge from the nozzle plate are granulated in an air stream and to effect cooling are fed to a ring of water spiral-like circulating in the dome or cap of the device. There are provided in the cutting tool head bores for feeding a gaseous medium into the range between the cutting tool head and the nozzle plate. The feeding of such flow of a gaseous medium which is directed toward the middle of the nozzle plate serves to obtain a pressure balance between the space defined by the cutting tool head and the nozzle plate and the remaining space in the device. A flushing action with respect to the cutting tools is not obtained as the feed of the gaseous medium does not extend into the range of the plane in which the cutting occurs. Moreover, to obtain an adequate flow of the gaseous medium an additional source of power is required. The referred to dome is designed to granulate the synthetic material in dry condition and, hence, it not suitable for processing synthetic materials requiring the afore-mentioned higher temperatures.

THE INVENTION

It is an object of the invention to provide a novel and improved sub-water granulating device for granulating synthetic plastics materials which produces an accelerated cooling of synthetic plastics materials granulated in hot condition thereby permitting the processing of synthetic plastics materials having a discharge temperature of up to 350° C. in economical quantities.

Another object of the invention is to provide a novel and improved sub-water granulating device which efficiently prevents the formation of clumps of still hot granules between the nozzle plate of the extruder and the cutting tool head.

SUMMARY OF THE INVENTION

The afore pointed objects, features and advantages and other objects, features and advantages which will be pointed out hereinafter and set forth in the appended claims are obtained by providing a cutting tool head surrounded in axial direction by a preferably cylindrical sleeve. One end of this sleeve is secured to a wall of a cap a dome including the cutting tool head. The sleeve and the cutting tool head define a ring-shaped space which is connected at its inlet side to an inlet for a supply of water. The discharge side of the ring space is provided with passage openings between the cutting tools. These openings are disposed at an angle relative to the cutting plane of the cutting tool head and in opposition to the rotational direction of the cutting tool head.

As a result, fresh water free of granules is fed to the inlet of the cutting tool head. This water due to the suction action to which it is subjected, impacts with separate streams upon the edges of the cutting tools thus cleaning the same. By revolving movement forced upon the water by the shape of the cutting tools the flushing effect is such that the granulate particles do not adhere to the cutting blade to any extent but will be swept out of the range of the cutting tools. Moreover, the inherent propeller action of the cutting tools which tends to direct the granulate particles toward the middle of the nozzle plate is prevented or at least reduced. Simultaneously, the cooling of the cutting tools is markedly improved.

A further advantageous aspect of the invention provides that the lengthwise axis of the crosswise circular passage openings define with the cutting plane of the cutting tools an angle of 45° and in radial direction is at a slant relative to the rotational axis. As a result it is assured that the flow of the cooling water is directed primarily upon the cutting tools.

BRIEF DESCRIPTION OF THE DRAWING

In the accompanying drawing a preferred embodiment of the invention is shown by way of illustration and not by way of limitation.

In the drawing.

DETAILED DESCRIPTION OF THE DRAWING

Figure 1:
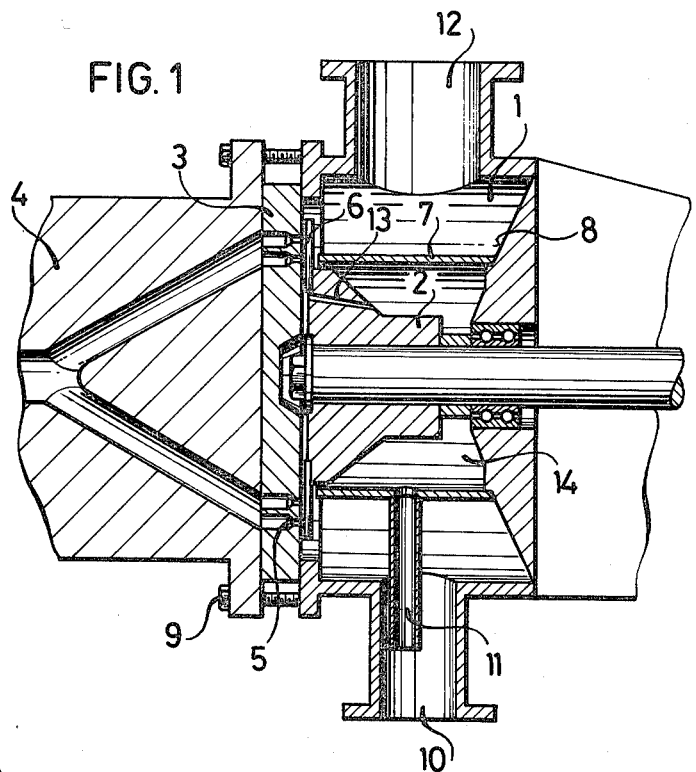
FIG. 1 shows a lengthwise section of a sub-water granulating device according to the invention in coaction with the nozzle plate of an extruder for discharging granulated thermoplastic synthetic plastics materials.

Referring to the drawing Figures more in detail, the granulating device according to the invention comprises a closed dome, hood or cap shaped member 1 and a cutting tool head 2. Head 2 is rotary in one direction and may be driven in said direction by conventional suitable driving means (not shown). In condition for operation cap 1 is liquid-tightly sealed to the facing side of the nozzle plate 3 of a conventional screw extruder 4 (only partly shown) by means of screws 9 or other suitable fastening means.

Circularly disposed discharge bores 5 in the nozzle plate 3 are closely positioned to cutting tools 6 mounted on the cutting tool head 2. A tubularly shaped sleeve 7 is at one end secured to a wall of cutting tool head 2 and encompasses the cutting tool head concentric therewith. The arrangement of the sleeve is so that its open end is close to the cutting tools 6 or in slight engagement therewith and also reaches the outer surface of the cutting tool head 2.

Feeding the inside of cap 1 with fresh water is effected by providing beneath the nozzle plate a conduit connector 10. This connector is in communication with an inlet pipe 11 for separately supplying water into the annular space 14 enclosed by sleeve 7. As a result, separate water free of granules is available for flushing the cutting tools 6.

The discharge of cooling water from the cap 1 which water also serves as transport medium for the produced granulate, is effected via a connection 12 leading to a separating device or stripper of conventional design (not shown).

Figure 3:
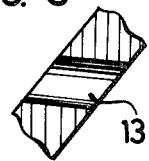
FIG. 3 is a fragmentary section along line III—III of the cutting head according to FIG. 2.
Figure 2:
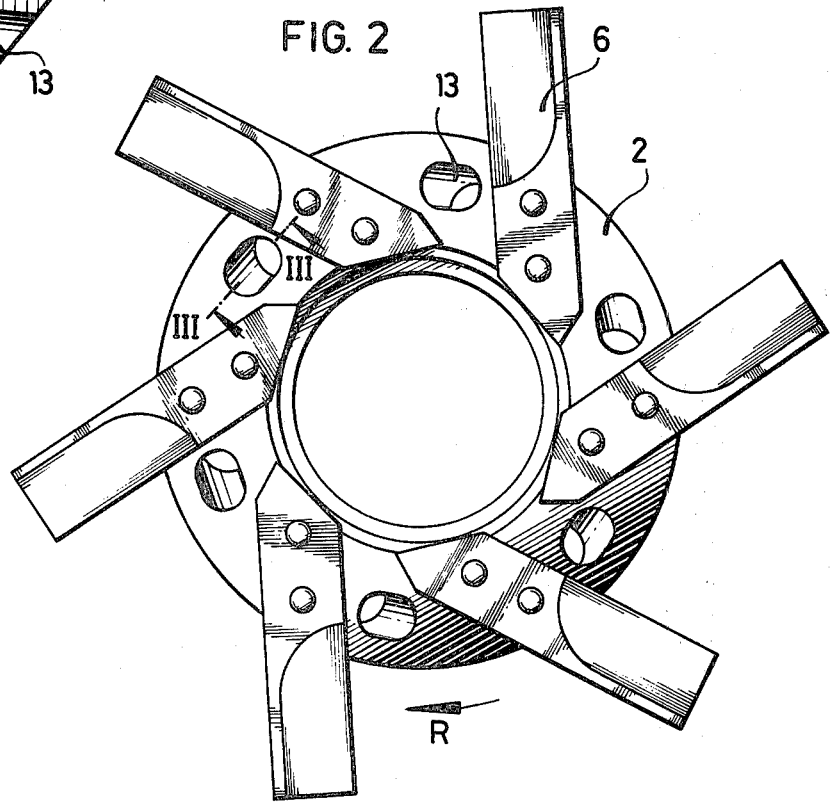
FIG. 2 shows a plan view of the cutting tool head of the granulating device according to FIG. 1 on an enlarged scale.

As it is shown in FIGS. 2 and 3, the cutting tool head 2 has between the cutting tools 6 pasage openings 13 which permit a flow of water from the annular space 14 defined by sleeve 7. This flow of water serves to clean and also to cool the cutting tools 6. The preferably cylindrical passage openings which extend from the support surface of the cutting tools 6 in the cutting tool head 2 are disposed relative to the rotational direction R of the head at an angle relative to said support surface as is best shown in FIG. 3 whereby the rotation of the cutting tool head causes a pumping action. As a result, fresh water flows through the passage openings from the annular space 14 surrounding the sleeve 7 within the range of each of the cutting tools 6. By an additional slight slant of the passage openings 13 in radial direction relative to the center axis of the cutting tool head 2 the flushing action upon the edges of the cutting tools 6 can be obtained. Moreover, the nozzle plate 3 is not exposed to direct action of the flushing water so that the cooling of the plates remains limited.

Due to the flushing of each of the tools 6 during the granulating operation the melt drops are separated at the nozzle plate 3 and are immediately carried to the outside by the flow of the flushing water so that adhesion of melt drops at the edges of the cutting tools 6 and thus blunting of the tools are efficiently prevented. Moreover, the formation of lumps by separated melt drops between the nozzle plate 3 and the cutting tool head 2 is prevented at least to a substantial extent as the flow of flushing water additionally cools the nozzle plate 3 and head 2 and travel of melt drops toward the middle of the nozzle plate is inhibited.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

We claim:

1. A sub-water granulating device for granulating thermoplastic synthetic plastic material capable of co-acting with the nozzle plate of an extruder, said device comprising in combination:

a one-way rotary cutting head including cutting tools; a dome encompassing said cutting head concentric therewith, said dome having connections for inlet and outlet of a flow of water; a tubular sleeve within said dome encompassing said cutting head coaxially therewith, one end of said sleeve being secured to an inner wall portion of the dome, said dome and said sleeve defining an annular space encompassing said cutting head coaxially therewith, said annular space communicating with the water inlet connection of the dome for feeding flushing water into said annular space and including outlet ducts for the flow of water from the annular space, each of said ducts facing the cutting tools in said cutting head and being slanted relative to the rotational axis of the cutting head and defining an angle relative to the rotational axis and in opposition to the rotational direction of the cutting head, the flushing water emerging from said ducts being discharged through the outlet connection in the dome.

2. The sub-water granulating device according to claim 1 wherein the cutting tools in said cutting head are elongate and radially spaced, said tools rotating in a common cutting plane upon rotation of said cutting head, and wherein each of said ducts defines an angle of about 45° relative to the rotational axis of the cutting head.

3. The sub-water granulating device according to claim 2 wherein each of said ducts is radially slanted in opposition to said rotational axis.

4. The sub-water granulating device according to claim 1 wherein each of said ducts has a substantially cylindrical cross section.

* * * * *